Figure 1:
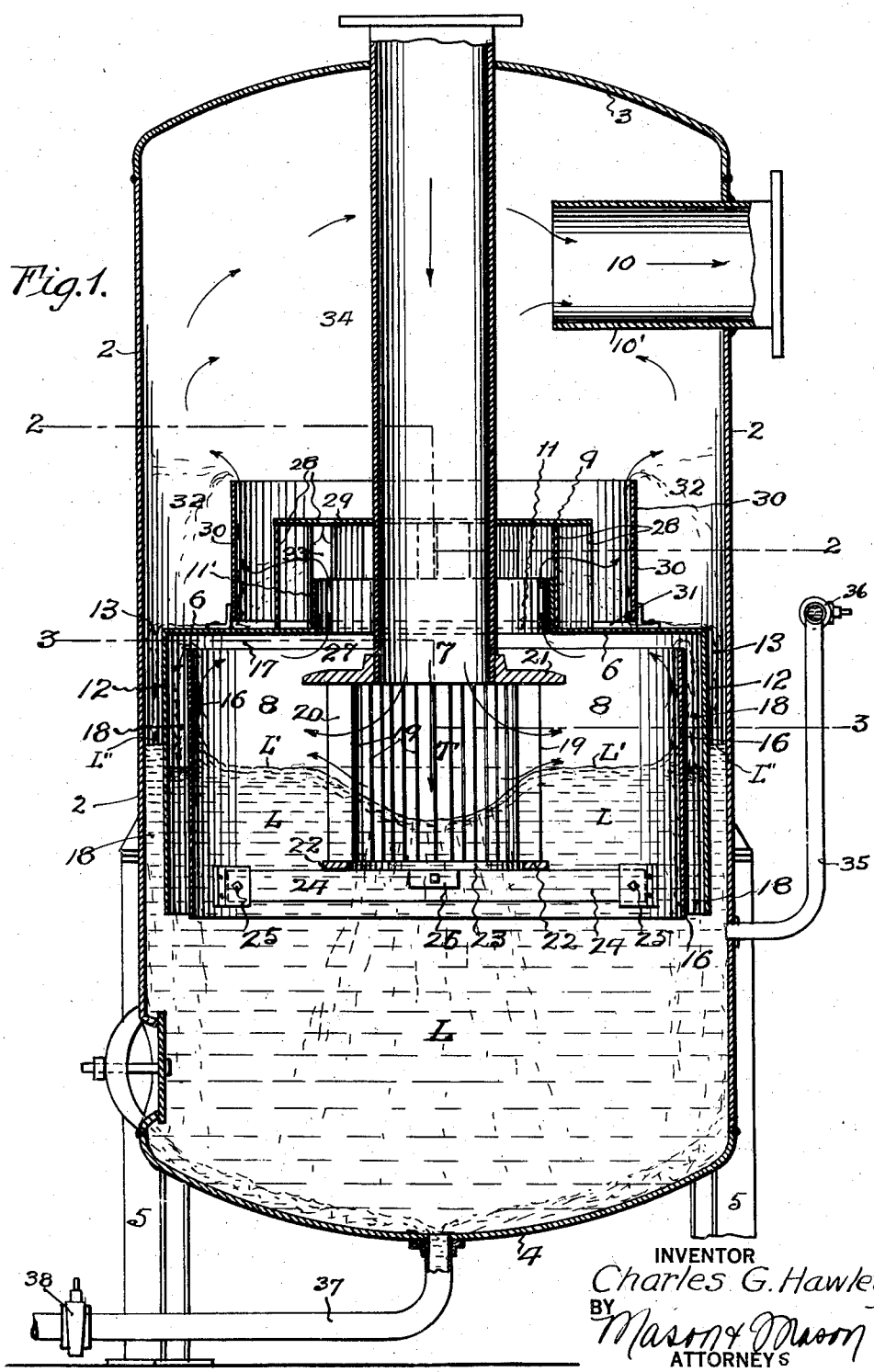

INVENTOR
Charles G. Hawley.
BY Mason & Mason
ATTORNEYS

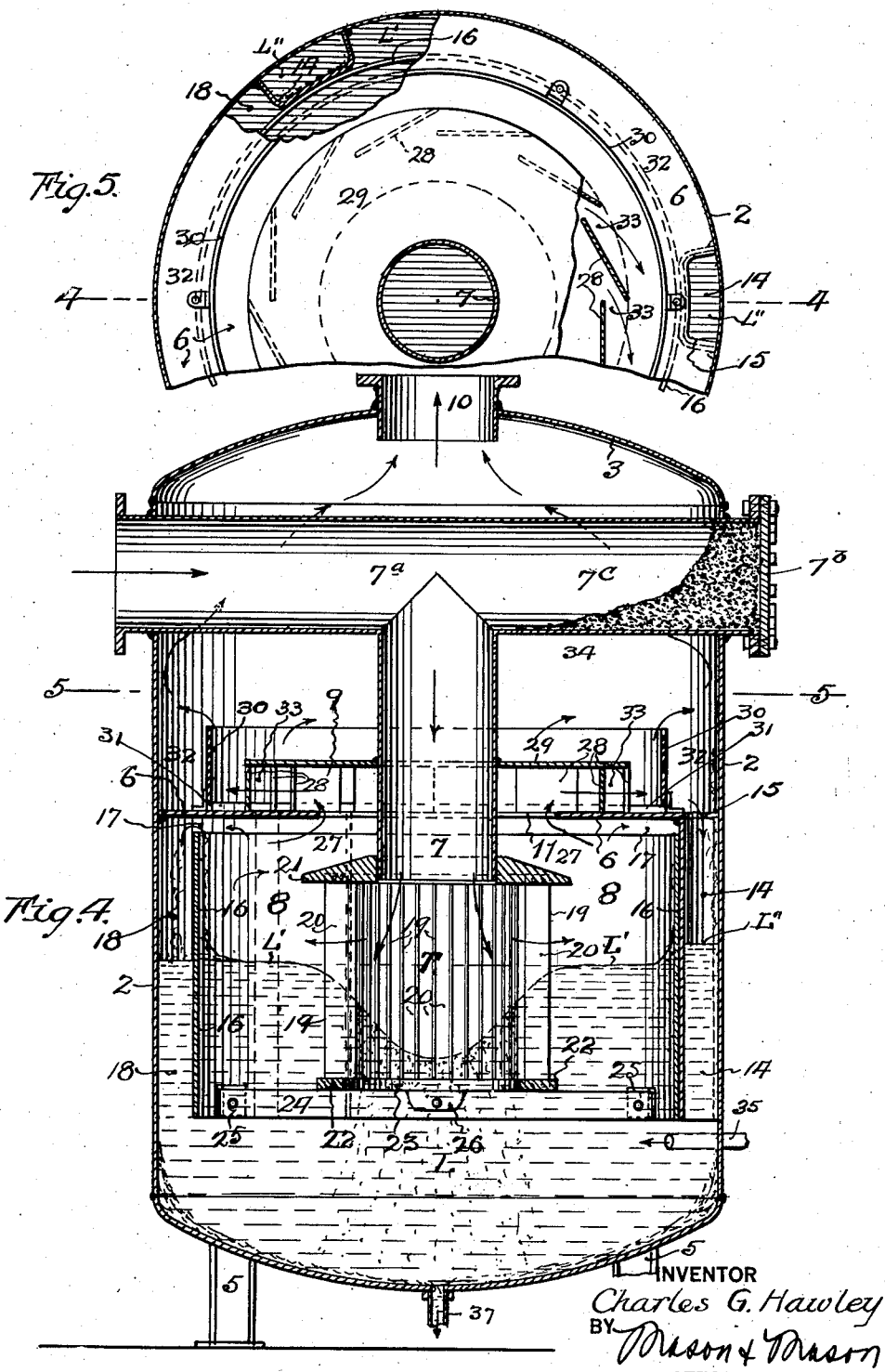

Patented June 11, 1935

2,004,467

UNITED STATES PATENT OFFICE 2,004,467

SCRUBBER

Charles Gilbert Hawley, Chicago, Ill., assignor to Centrifix Corporation, Cleveland, Ohio, a corporation of Ohio Application February 2, 1932, Serial No. 590,491

5 Claims. (Cl. 183—25)

This application is related to my earlier applications applying to the same arts and identified as Serial Number 463,734, filed June 23, 1930, and Serial Number 509,750, filed January 19, 1931.

This invention relates to improvements in centrifugal scrubbers and driers, and involves a process of scrubbing gases, vapors and air in a state of flow. Such process comprises steps by which substances not wanted in a major volume of aeriform fluid are transferred to a minor body of liquid, wherewith they may be removed or wasted. The process includes and the novel apparatus provides for the intimate admixture of the lighter fluid with an appropriate liquid and immediate subsequent separation from that liquid; to the end that the gas, vapor or air may be discharged in a predetermined state of improvement or to the end that the liquid selected for use shall be charged with a desirable substance or improved in character. By the means here provided various aeriform fluids may be cleaned or changed in nature or condition through the separation of objectionable or of valuable substances or by the addition of absorbable substances. Or if desired, heat may be transferred from one fluid to the other. The purification of both natural and manufactured gases and vapors, the dehydration thereof, and, the so-called conditioning of air and vapors exemplify one group of uses to which this invention is suited. Recoveries of tars, oils, condensible vapors and absorbable substances from natural and manufactured gases exemplify another group.

Further, this invention has for its purpose, and comprises, an improved process and apparatus wherein and whereby liquids of various kinds may be, and are, changed in nature or condition through being heated or cooled, deprived of volatile burdens, or supplemented by the addition of absorbable substances; all by intimate admixture and contact with a supplied gas or gases appropriate to the individual needs. The aeration, the gassification, the "loading" of liquids, and the cooling and heating of liquids, all exemplify such uses of this invention.

Whatever the use or purpose, the invention proceeds by organizing a stream of the aeriform fluid and causing that stream to rapidly descend toward and vigorously impact a body of the liquid required for the given case, thereby transferring heavier particles from the lighter to the heavier fluid and continuously or progressively shattering and dispersing the liquid by means of and within the streams of lighter fluid, thus causing the intimate contact of the differing fluids to complete the desired transfer of substances from one to the other. Following such controlled and dynamic contact, the lighter fluid is caused to rise slowly toward a point of egress. It is caused to whirl as it rises and the lighter fluid ejects or separates any excess of liquid which may have been entrained in the stage of intimate admixture. Obviously, the liquid remaining from the process is disposed of or is treated as its changed nature or condition may require, and likewise, the aeriform fluid having been utilized or treated, passes onward toward any desired point of use or further treatment.

For sake of brevity hereinafter, the word "gas" will be used to define all gases, vapors, air and aeriform compounds. Specific names will be substituted whenever it is necessary to mention particular aeriform fluids.

The chief element of the novel apparatus embodying this invention comprises a closed container which is suited to the kind and pressure of the gas to be treated. The latter passes through the container and utilizing its own dynamic force, is first admixed with and then separated from a liquid suited to the purpose. In most instances the container comprises an upright cylindrical drum and both the gas inlet and gas outlet are provided at the top of the drum. The drum is kept partly filled with the appropriate liquid, which liquid may be partly or wholly derived from the gas under treatment, though it is usually supplied from a separate source. The gas enters through a vertically positioned pipe or nozzle which opens downward at a point above the surface or level of the liquid. The liquid therefore receives the direct impact of the downflowing gas and in consequence most of the heavier substances carried by the gas and such as are absorbable by the liquid are forcibly driven into contact with the liquid and are retained therein. The process is attended by subsequently enforced contacts of the gas and liquid, brought about through the agency of a whirl-promoting tuyère combined with the lower end of the nozzle and by means of a definitely restricted mixing chamber which surrounds such tuyère in the lower part of the drum and which chamber also constitutes a major liquid separator; following which the gas is finally dried or separated from liquid by a conjoined centrifugal separator provided in the upper part of the drum.

The invention will be fully understood upon reference to the following detailed description and the accompanying drawings which depict the invention in its best forms.

Figure 2:
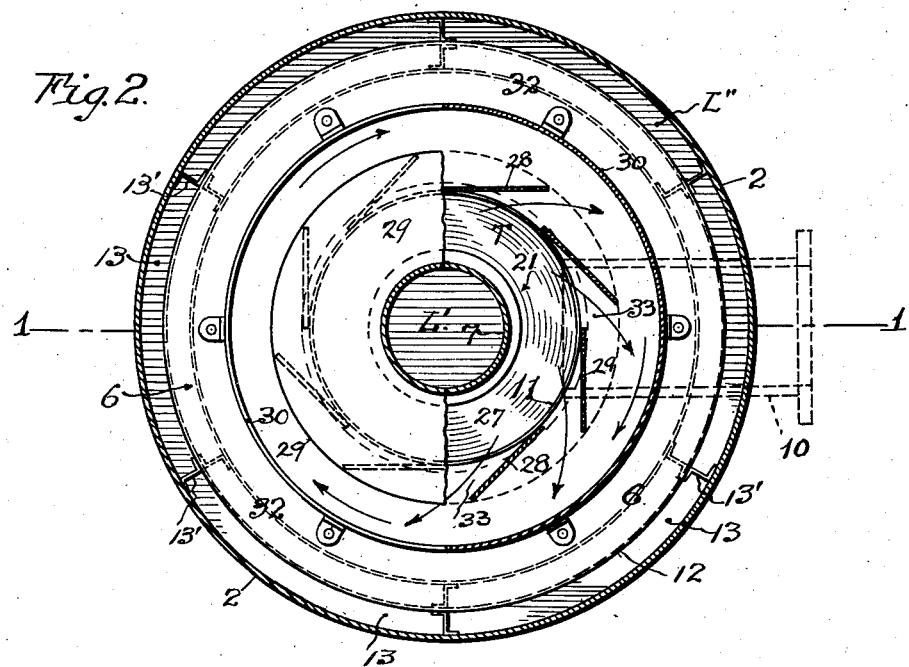
Figure 3:
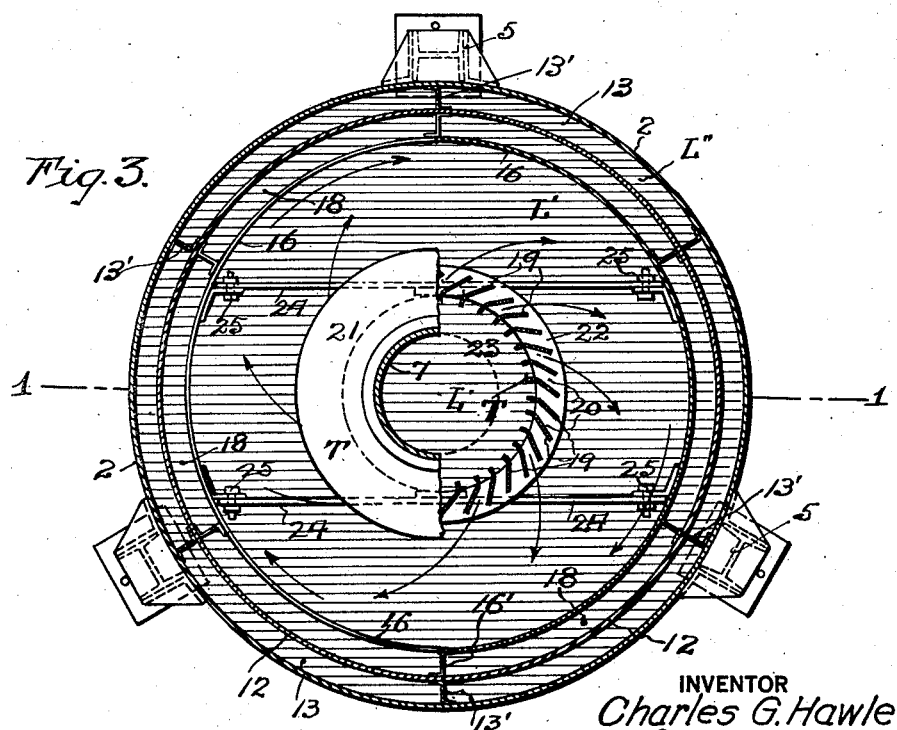

In said drawings, Fig. 1 is a vertical section of a scrubber and drier embodying the present invention, the section being taken upon the line 1—1 of Figs. 2 and 3; Fig. 2 is a horizontal section on the irregular line 2—2 of Fig. 1; Fig. 3 is a horizontal section on the line 3—3 of Fig. 1; Fig. 4 is a vertical sectional view, on the line 4—4 of Fig. 5, illustrating a modified form of the invention; and, Fig. 5 is a fragmentary horizontal section on the line 5—5 of Fig. 4.

The scrubbers embodying the present invention are constructed and intended for direct inclusion in gas lines, and the energy required for efficient operation is derived directly from the moving gas. The scrubber has no parts to which movement must be imparted. Instead, its presence in the gas passage causes collisions and movements which result in cleaning the gas by admixture with a liquid and in the drying of the gas before it leaves the scrubber. The few metal parts making up the scrubber are all fixed to resist movement and it is completed and rendered most effective by a quantity or body of liquid, L, which occupies the lower part of the scrubber. That liquid receives the impact of the passing gas and is also violently admixed therewith, only to be instantly separated therefrom and retained in the scrubber. The transfer of substances takes place rapidly, various substances being retained by the liquid, or if desired the gas is charged with substances taken from the liquid.

This scrubber is generally employed in treating gases and vapors at relatively high pressures and usually takes one or the other of the forms shown in Figs. 1 and 4. In other words, the body of the scrubber usually comprises the strong cylindrical drum 2 having proper convex heads 3 and 4. It is supported in vertical position as by legs or columns 5. Figures 1 and 4 differ in some particulars which will be explained, but in the main, are alike and for the sake of brevity, like parts will be identified by the same reference marks.

A horizontal floor 6 about midway of the height of the drum divides the drum into upper and lower compartments. The lower compartment contains the before-mentioned liquid, L; also a gas inlet nozzle 7, and a gas-and-liquid mixing and separating chamber 8. The upper compartment is devoted to the collection and final drying of the gas before it leaves the scrubber; and contains an individual centrifugal separator 9, and the gas outlet 10. The gas enters the lower compartment through the downward leading central nozzle 7, which terminates midway between the floor 6 and the surface L' of the body of liquid. A large central opening 11 in the floor 6 constitutes the gas outlet of the lower compartment and through that opening 11, the outgoing gas enters the separator 9. The actual lower end of the nozzle 7 extends below the level L' being formed by the tangentially bladed whirl-promoting tuyère T which is partly submerged in the liquid. The bottom of that tuyère opens into the lower part of the liquid body L, as will be further explained.

The bottom of the mixing chamber 8 is formed by the surface of the liquid L; its top is formed by the floor 6. In the case of Figs. 1 to 3, the outer wall of the mixing chamber 8 is formed by a cylindrical shell 12 which depends from the floor 6 and hangs well below the liquid level L'. The cylindrical part 12 is of less diameter than the drum, leaving an annular space 13; and that space is employed as a drain for the upper compartment in the drum, as will be further explained. The floor 6 and the wall 12 are tightly joined, as by welding, and both are fixedly supported within the drum 2 by a number of fixed vertical spacers 13' (see Figs. 2 and 3). In the case of Figs. 4 and 5 the outer wall of the mixing chamber 8 is provided by the wall 2 of the drum and the above mentioned drain 13 finds a counterpart in one or more vertical ducts 14, as shown in Figs. 4 and 5, which join openings 15 in the floor 6 with the underlying body of liquid L, serving as drains for the upper compartment, as will be further explained.

Each mixing chamber contains a circumferential liner 16, of less diameter and of less height than the mixing chamber, a circumferential slot or opening 17 remaining between the upper edge of the liner and the under side of the floor 6, and leading into the top of the annular space 18 surrounding the part 16. The latter may be better described as a separating shell; for it takes part in the first or major separation of gas and liquid, following the forcible mixing thereof, as presently to be described. In the case of Figs. 1 to 3, the liner 16 is supported by a plurality of vertical spacers 16'; whereas the liner 16 of Figs. 4 and 5 is attached to the downspouts or drains 14 that hang from the openings 15 in the floor. As shown, the separating shells 16 extend well below the liquid level; and further, the space 18, back of or outside each shell 16 is open at the bottom and hence in free communication with the lower part of the body of liquid L.

The partly submerged tuyère T comprises a circumferential series of angularly disposed blades 19 which form a plurality of slot-like tangential tuyère openings 20, all having the same direction and leading into the space 8 within the separator shell 16. The upper ends of the blades are held in or by a ring 21 that fits the lower end of the nozzle 7. The lower ends of the blades are held in or by a ring 22 having within it an opening 23, preferably of the full internal diameter of the tuyère.

The tuyère T is a substantial and rigid element, and most conveniently, it is supported by a pair of cross-bars 24 that extend from side to side of the separator shell 16 and which are detachably bolted thereto, as well shown at points 25. Lugs 26 formed on the tuyère bottom or ring 22 are bolted to respective cross-bars 24 and serve to hold the tuyère firmly against rotation. The tuyère T may be fixed on the lower end of the nozzle 7, such practice being followed in scrubbers of the smaller sizes, but scrubbers of the larger sizes involve forces which make it desirable to both support and fasten the tuyère more firmly and to positively prevent its displacement by the surging liquid in which it is submerged or by the torsional reaction of the gases leaving its inclined or tangential tuyères 20.

An ample annular space 27 is provided between the top 21 of the tuyère and the floor 6, beneath the opening 11; and through that opening the gas whirls from the chamber 8 and rises into the separator 9. As shown in Figs. 1 and 2, the opening 11 may be marked by an upstanding collar 11'. The latter becomes a convenient part of the construction of the separator 9, with the floor 6 serving to hold the circumferential series of blades or vanes 28 belonging thereto. But the blades 28 may be spaced away from the opening 11 and may rise directly from the floor, as shown in Figs. 4 and 5. The top of the separator is formed by the circular plate 29 which tightly surrounds the central nozzle 7. All parts (6, 28 and 29) are preferably welded together and form a rigid and immovable structure. The separator preferably includes and is completed by a low cylindrical wall 30 which is concentric therewith and positioned between the same and the inner wall of the drum 2. The wall 30 is spaced from the floor to provide a narrow opening or openings 31 for the discharge of the liquid ejected by the separator, as hereinafter explained. The part 30 rises somewhat above the separator top 29 and is surrounded by a relatively wide annular space 32, the bottom of which is formed by the floor 6.

As best shown in Figs. 2 and 5, the inclined blades 28 provide respective separators with many tangential outlets or tuyère openings 33, all having the same direction. The tuyère openings 33 are relatively narrow and the height thereof being small, their aggregate area does not greatly exceed the cross-sectional area of the inlet nozzle 7. In consequence, the gas is certain to emerge from the tuyère openings 33 at high velocity and to meet the opposed wall 30 at acute angles, resulting in an excellent centrifugal separation of all residues. The near presence of the surrounding wall 30 ensures a centrifugal separation of high quality.

The large open space 34 above the separator constitutes the final separating and collecting chamber of the scrubber. The nozzle 7 appearing in Figs. 1 to 3 extends downward through the drum top 3, and the outlet 10 thereof is provided by a horizontal pipe 10' which extends from the central portion of the chamber 34 and opens outward through the side of the drum 2. In contrast, the nozzle 7 of Figs. 4 and 5 is supplied with gas by way of a horizontal cross pipe 7a, both ends of which preferably extend through the sides of the drum, one end thereof being closed as shown at 7b. The outlet 10 of Fig. 4 may be placed either in the top 3 of the drum or may be like the pipe 10' and extend through the side of the drum, at right angles to the pipe 7a, as may be most convenient. It is to be noticed that in both constructions and by reason of the employment of the centrifugal separator the gas, rising from the lower compartment is delivered outwardly against the inner wall of the drum and must react from that point in order to reach the outlet 10. High final efficiency is thus ensured.

The structure of Fig. 1 is preferred whenever it is convenient to have the gas enter the drum through an axially positioned pipe. The cross pipe 7a of Fig. 4 is used where it is more convenient to have the gas enter the drum at the side. The construction including the pipe 7a is of further advantage because the closed end of the pipe 7a provides a gas and dust cushion or pocket 7c, a detail which prevents excessive wear.

Liquid is supplied to the drum through a feed pipe 35 containing a suitable valve 36 (see Fig. 1). For draining sludge and liquid from the drum, a blow-off pipe 37 is provided at the bottom of the drum. The blow-off valve 38 appears in Fig. 1. By manipulating the valves 36 and 38 or equivalent means, the level L' of the absorbing liquid is maintained substantially as indicated in Figs. 1 and 4.

When charged with liquid, L, of a kind suited to the gas to be treated, the scrubber is ready for operation; and, gas being admitted through the nozzle 7 and released through the outlet 10, the operation proceeds as follows:—

The stream of gas organized by the nozzle 7 directly impacts the opposed liquid within the tuyère T; tending to depress the exposed surface, as shown in the drawings. The heavier substances carried by the gas are thus directly delivered to the liquid and are retained thereby, the gas passing off laterally through the many tangential openings 20 of the tuyère T. As will be apparent from the use of such tuyères, the gas takes on a violent swirling or vortexial movement within the chamber 8 and as a result the liquid therein is violently agitated and admixed with the gas. In addition, a direct centrifugal separation is caused to take place upon the separating shell or wall 16 and thus further purification of the gas is brought about. The central opening 11 provides the only outlet through which the gas may escape from the chamber 8 and having imparted and swept the liquid, the gas whirls upward within the chamber 8. Much of the liquid is projected against the wall 16 and is whirlingly carried to the top thereof, where it is centrifugally discharged into the surrounding space 18. Falling therein the rejected liquid rejoins the liquid body L in the lower part of the drum. Thus the before-mentioned major separating effect is accomplished. Thereupon the gas reacts toward the axis of the drum and whirls inward and upward through the passage 27, thus entering the separator 9. By means of the latter, the gas stream is subdivided into many tangential streams which, as explained, emerge at high velocity and after impacting the opposed wall 30, whirl upward within the annular space between the tuyère blades 28 and the wall 30.

A fine centrifugal separation is produced by the action next above described, and the residual liquid collected upon the wall 30 is centrifugally discharged therefrom, both through the slot 31 and across the upper edge or rim of the wall 30. Obviously, there is little movement of the gas in the space 32 and little remaining tendency to elevate moisture into the upper part of the drum. The residual moisture which is separated in the upper chamber of the drum drains downward, off the floor 6 and rejoins the liquid body L, through the space 13 of Fig. 1 and through the ducts 14 of Figs. 4 and 5.

Attention is called to the fact that the liquid level L'' in the outer drain passage or passages is slightly higher than the level L' within the body of the scrubber. This greater height of the liquid column which belongs to the upper part of the drum is explained by the fact that the gas pressure within the chamber 8 is necessarily higher than the pressure within the collection chamber 34; and the difference of pressure is reflected by the comparative levels L' and L''. It is the practice to provide these scrubbers with liquid level indicators, usually gauge glasses, in order that the level L' may be known and maintained. That level being of the greater importance, the gauge should be connected with the space 8 rather than with either of the outer drain passages here shown.

Upon emerging from the collar or wall 30 of the separator 9, the gas whirls outward and upward within the chamber 34 and its velocity is much reduced by expansion. Thus a final elimination and precipitation of moisture is ensured. Reacting then toward the axis of the drum the purified gas finally departs through the outlet 10; which as stated, is positioned to take the gas from the central portion of the drum.

The foregoing may be taken as descriptive of the process of purifying various aeriform fluids and resulting in the abstraction or separation of substances of greater specific gravity and their retention thereof by the liquid employed. The mere operation of the process is not changed when the purpose is to charge or burden a given gas with moisture or vapors taken from an appropriate liquid L within the scrubber. In such cases, the violent impacts and the centrifugal mixing of the liquid and gases result in the quick transfer of desired substances, from the liquid to the gas; and the subsequent operation of the separator 9 has the effect of preventing the physical entrainment of liquid in the outgoing gas.

The scrubber has an obvious use in the transfer of heat from one to the other of the mediums employed.

The many advantages possessed by the scrubber will be apparent to those skilled in the art. This scrubber is peculiar in that it works best with gas moving at high velocity. Its operation is not materially affected by ordinary variations of pressure or velocity. The scrubber is self-cleaning and not apt to become clogged. It operates with a minimum drop of pressure, between inlet and outlet. It is of high efficiency, occupies comparatively little space, and is of comparatively low cost.

Having thus described my invention I claim as new and desire to secure by Letters-Patent:—

1. The herein described scrubber comprising, in combination, a closed chamber containing a horizontal floor that divides it into upper and lower compartments, a gas inlet nozzle leading downward through said floor and terminating in an open bottomed whirl-promoting tuyère supported within said lower compartment, a separating wall surrounding said tuyère and spaced from said floor, said wall depending toward the bottom of said lower compartment, a drain passage leading from the top of said floor toward the bottom of said lower compartment, another drain passage leading toward the bottom from the top of said wall, a co-axial gas passage provided in said floor, a tangentially bladed centrifugal separator forming a restricted gas outlet leading from said passage into said upper compartment, and, a gas outlet leading centrally from said upper compartment.

2. The herein described scrubber, comprising a vertical drum having a gas outlet in its top, in combination with a floor containing a central gas passage and dividing the drum into upper and lower compartments, a drain belonging to the upper compartment and leading downward from the peripheral portion of said floor, a gas inlet nozzle extending downward through said passage and of less diameter, a bottomless whirl-promoting tuyère forming the terminus of said nozzle within said lower compartment, a cylindrical separating wall therein surrounding said tuyère and of greater diameter than said passage, the upper edge of said wall being spaced from the under side of said floor, a circumferential drain outward of said wall and leading downward from the under side of said floor, means adapted to maintain a stand of liquid within said drum and partly submerging said tuyère, separating wall and drains, a tangentially bladed tuyère erected on the top of said floor in communication with said passage, and, a cylindrical separating wall erected on said floor between said bladed tuyère and the inner wall of the drum, substantially as and for the purposes described.

3. The herein described scrubber, comprising a vertical drum having a gas outlet in its top, in combination with a floor containing a central gas passage and dividing the drum into upper and lower compartments, a drain belonging to the upper compartment and leading downward from the peripheral portion of said floor, a gas inlet nozzle extending downward through said passage and of less diameter, a bottomless whirl-promoting tuyère forming the terminus of said nozzle within said lower compartment, a cylindrical separating wall therein surrounding said tuyère and of greater diameter than said passage, the upper edge of said wall being spaced from the under side of said floor, a circumferential drain outward of said wall and leading downward from the under side of said floor, and means adapted to maintain a stand of liquid within said drum and partly submerging said tuyère, separating wall and drains.

4. The herein described scrubber, comprising a vertical drum having a gas outlet in its top, in combination with a floor containing a central gas passage and dividing the drum into upper and lower compartments, a drain belonging to said upper compartment and leading downward from the peripheral portion of said floor, a gas inlet nozzle extending downward through said passage and of less diameter, means adapted to maintain a stand of liquid within said lower compartment and partly submerging said drain, a tangentially bladed tuyère erected on the top of said floor in communication with said passage, and, a cylindrical separating wall erected on said floor spaced between said bladed tuyère and the inner wall of the drum, substantially as and for the purposes described.

5. The herein described process of treating dust-laden gas that consists in directing a stream thereof downward and perpendicularly against the surface of a body of appropriate liquid thereby directly transferring dust to said liquid, thereafter producing a whirling movement of the gas and liquid in the region surrounding the place of such impact and thus mixing the partially purified gas with liquid and accomplishing the transference of further dust to said liquid, immediately permitting such whirling movement to centrifugally separate the major part of the dust laden liquid from the whirling gas, returning the separated liquid to said body and allowing the immediate upward escape of the whirling gas with the same continuing upward movement into and beyond an upper zone but restricting such upward outflow to swift whirling movement within said upper zone thereby separating residual liquid, returning such residue to said body while permitting the whirling and upward expansion of the escaping gas and finally releasing the gas beyond said zone.

CHAS. GILBERT HAWLEY.